(12) United States Patent
Nakamura et al.

(10) Patent No.: US 6,513,396 B2
(45) Date of Patent: Feb. 4, 2003

(54) MAGNETIC SENSOR, MAGNETIC SENSOR DEVICE, AND TORQUE SENSOR

(75) Inventors: Munehisa Nakamura, Tsurugi-machi (JP); Mahito Shiba, Kashiwara (JP); Yoshitomo Tokumoto, Nabari (JP)

(73) Assignees: Murata Manufacturing Co., Ltd. (JP); Koyo Seiko Co., Ltd. (JP)

( * ) Notice: Subject to any disclaimer, the term of this patent is extended or adjusted under 35 U.S.C. 154(b) by 0 days.

(21) Appl. No.: 09/888,680

(22) Filed: Jun. 25, 2001

(65) Prior Publication Data

US 2002/0020229 A1 Feb. 21, 2002

(30) Foreign Application Priority Data

Jun. 23, 2000 (JP) ........................................ 2000-190332

(51) Int. Cl.⁷ ................................................ G01L 3/02
(52) U.S. Cl. ................................................ 73/862.335
(58) Field of Search ..................... 73/862.331, 862.332, 73/862.333, 862.334, 862.335

(56) References Cited

U.S. PATENT DOCUMENTS

| | | | | |
|---|---|---|---|---|
| 3,611,417 A | * | 10/1971 | Sauter et al. ............... | 360/123 |
| 4,607,305 A | * | 8/1986 | Milo ....................... | 29/603.05 |
| 4,725,776 A | * | 2/1988 | Onodera et al. ....... | 324/207.21 |
| 4,933,580 A | * | 6/1990 | Ishino et al. ................. | 310/26 |
| 5,301,559 A | * | 4/1994 | Tsuji et al. ................. | 324/209 |
| 5,351,555 A | * | 10/1994 | Garshelis ..................... | 336/30 |
| 5,442,966 A | * | 8/1995 | Hase et al. ............ | 73/862.333 |
| 5,850,045 A | * | 12/1998 | Harada et al. ................ | 73/779 |

* cited by examiner

Primary Examiner—Max Noori
(74) Attorney, Agent, or Firm—Ostrolenk, Faber, Gerb & Soffen, LLP

(57) ABSTRACT

A cylindrical rotating member is provided with a magnetic element, which are an object that is detected, on the outer surface thereof. The magnetic element is led around the rotating member by one turn and is at an angle relative to the rotating direction of the rotating member in an approximately linear manner. End portions of the magnetic element are disposed at approximately the same position in the radial direction of the rotating member. Magnetoresistive elements are arranged in a direction perpendicular to the rotating direction of the magnetic element (in other words, axial direction of the rotating member) with a gap therebetween and oppose the magnetic element.

12 Claims, 14 Drawing Sheets

PHASE ANGLE (DEGREE)

MAGNETIC SENSOR, MAGNETIC SENSOR DEVICE, AND TORQUE SENSOR

BACKGROUND OF THE INVENTION

1. Field of the Invention

The present invention relates to magnetic sensors, magnetic sensor devices, and torque sensors. More specifically, the present invention relates to a magnetic sensor, a magnetic sensor device, and a torque sensor, which are used in, for example, an electric power steering apparatus installed in vehicles.

2. Description of the Related Art

As shown in FIGS. 28 and 29, conventionally, when variation in a rotation angle of an object is detected by a magnetic sensor without contacting the object, a gear 1 is used as the object, and the magnetic sensor 2 is used for generating a pseudo sine-wave (see FIG. 30). The rotational position of the gear 1 is determined by counting the number of pulses in the pseudo sine-wave. In order to improve the detection accuracy, the pseudo sine-wave is processed by a multiplication circuit. Typically, the magnetic sensor 2 includes two magnetosensitive elements 3a and 3b to obtain one signal. The magnetosensitive elements 3a and 3b are arranged in the rotating direction of the gear 1 with a gap therebetween, the size of the gap being half the size of the pitch between the teeth of the gear 1.

On the other hand, electric type power steering apparatuses have been developed for increasing the power to turn a steering wheel of a vehicle. In such apparatuses, a steering torque applied by a driver is detected, and an assisting force is generated in accordance with the detected torque by an electric motor provided in a steering mechanism.

With respect to sensors for detecting the steering torque, non-contact type torque sensors having a simple construction are preferably used from the viewpoint of reliability and cost. In conventional torque sensors, the steering torque is determined from a magnetostriction, variation in inductance, a sliding friction, etc., or by using a potentiometer, etc.

With respect to conventional magnetic sensors, however, the detection accuracy is limited by the resolution of pulses, and there is a problem in that variation in small rotation angles cannot be detected with sufficiently high accuracy.

In addition, in torque sensors which determine a torque from a sliding friction or by using a potentiometer, there is a problem in that abrasion of a slider and a resistor occurs at contacting parts thereof. In addition, there is also a problem in that, since the torque sensors are usually disposed near a driver, the driver feels discomfort by noises generated from the contacting parts of the slider and the resistor. In addition, in a case in which a torque is converted into a linear movement of a sliding member, there are parts which are mechanically in contact. Thus, there is a problem in that sufficient durability cannot be obtained due to abrasion of the contacting pares. Furthermore, with respect to other conventional torque sensors, there is also a problem in that, since a large number of machined components, some of which having a complex shape and requiring high dimensional accuracy, are necessary, a high cost is incurred.

SUMMARY OF THE INVENTION

Accordingly, an object of the present invention is to provide a magnetic sensor, a magnetic sensor device, and a torque sensor, which are able to detect a variation in a rotation angle with high accuracy even when the variation is significantly small, and of which the construction is simple.

In order to attain the above-described object, according to the present invention, a magnetic sensor, which is used for detecting a rotational displacement of a magnetic element disposed such that the magnetic element is inclined substantially linearly with respect to the rotating direction thereof, includes a plurality of magnetosensitive elements which are arranged in a direction perpendicular to the rotating direction of the magnetic element with a gap therebetween and face the magnetic element, at least parts of the respective magnetosensitive elements overlapping on end portions of the magnetic element in a direction perpendicular to the rotating direction of the magnetic element.

In addition, a magnetic sensor device according to the present invention includes a magnetic element which is provided on a surface of a rotating member such that the magnetic element is inclined substantially linearly with respect to the rotating direction of the rotating member; and a magnetic sensor for detecting a displacement of the magnetic element caused by the rotation of the rotating member, the magnetic sensor including a plurality of magnetosensitive elements which are arranged in a direction perpendicular to the rotating direction of the magnetic element with a gap therebetween and face the magnetic element, at least parts of the magnetosensitive elements overlapping on end portions of the magnetic element in a direction perpendicular to the rotating direction of the magnetic element.

Preferably, a distance between the magnetic element and the magnetosensitive elements is 0.3 mm or greater. In addition, the magnetosensitive elements are, for example, semiconductor magnetoresistive elements.

Since the magnetic sensor faces the magnetic element which is fixed to the rotating member, the magnetic sensor is mechanically independent from the rotating member and is able to detect the displacement of the magnetic element without contacting it. In addition, since contacting parts are not included in the mechanism, a completely non-contact detection is achieved. In addition, since the number of machine-processed components is small and constructions thereof are simple, the magnetic sensor device and the torque sensor are provided at low cost. In addition, the pseudo sawtooth wave having a broad linear region can be obtained as the output signal from the magnetic sensor, and small variation in the rotation angle can be detected with high accuracy.

In addition, by setting a gap between the magnetosensitive elements to be larger than a gap between the end portions of the magnetic elements, the resistances of the magnetosensitive elements vary more smoothly by the rotation of the magnetic element. In addition, by arranging the magnetosensitive elements such that all regions thereof face the magnetic element in the direction perpendicular to the rotating direction of the magnetic element, sensitivity of the magnetosensitive elements increases. In addition, by arranging the magnetosensitive elements such that approximately all of the regions thereof face the end portions of the magnetic element, linear regions in the pseudo sawtooth wave are made broader, and sensitivity of the magnetosensitive elements increases.

In addition, by disposing a plurality of magnetic elements in the rotating direction thereof, every time the rotating member is rotated by one turn, two or more periods of pseudo sawtooth wave is obtained from the magnetic sensor as the output signal. As a result, sensitivity of the output signal to small variations in the rotation angle is increased. Moreover, by counting the periods of the pseudo sawtooth wave, the torque sensor can also be used as a steering angle sensor.

In addition, according to the present invention, a torque sensor, which is used for detecting a torque applied between a plurality of shafts which are connected to each other via a torsion bar and are able to rotate relative to each other due to the torsional deformation of the torsion bar when the torque is applied, includes the above-described magnetic sensor or the above-described magnetic sensor device for each of the shafts.

When the torsion bar which is disposed between the shafts is not twisted, the voltage difference between the output signals obtained from the respective magnetic sensors which are individually provided for the shafts does not change. When the torsion bar is twisted, relative position between the magnetic elements which are individually provided on the rotating members varies, so that the voltage difference between the output signals varies in accordance with the applied torque. According to change in voltage difference between these output signals, difference of relative angle between the shafts is detected. Thus, the torque is calculated from the Young's modulus of the torsion bar.

The torque sensor according to the present invention may include two or more magnetic sensors provided for each of the shafts. The phases of the respective output signals obtained from the magnetic sensors differ from each other by, for example, approximately 180 degrees, approximately 120 degrees, etc.

For example, two magnetic sensors may be provided for each of a plurality of shafts, and the two magnetic sensors may be disposed such that the phases of the respective output signals obtained therefrom differ from each other by approximately 180 degrees. Accordingly, in a case in which it is difficult to detect the voltage difference from the output signal obtained from one of the two magnetic sensors, the output signal obtained from the other one of the two magnetic sensors can be used for detecting the voltage difference. Thus, the torque can be detected with higher accuracy.

In addition, three magnetic sensors may be provided for each of a plurality of shafts, and the three magnetic sensors may be disposed such that the phases differ from each other by approximately 120 degrees. Accordingly, in a case in which it is difficult to obtain the output signal from one of the three magnetic sensors, the output signal can be obtained from either one of the other two magnetic sensors. Furthermore, when malfunction of one of the three magnetic sensors occurs, the one that is malfunctioning is easily identified. In addition, the electric power is not necessarily cut when the malfunction occurs, and detection of the torque and the steering angle can still be performed by the remaining two magnetic sensors for the time being.

DESCRIPTION OF THE PREFERRED EMBODIMENTS

Figure 1:
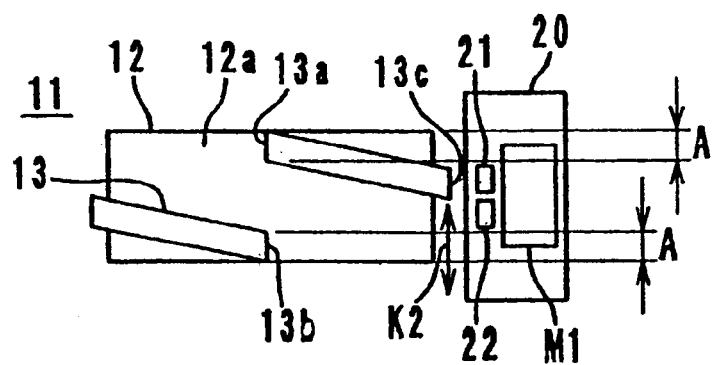
FIG. 1 is a front view of a magnetic sensor device according to an embodiment of the present invention.

Magnetic sensors, magnetic sensor devices, and torque sensors according to embodiments of the present invention will be described below with reference to the accompanying drawings. In the following descriptions, components and parts which are similar to each other are denoted by the same reference numerals.

Figure 2:
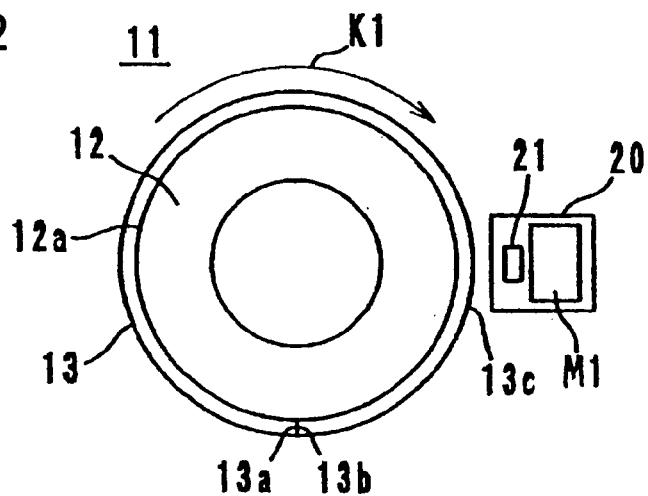
FIG. 2 is a plan view of the magnetic sensor device shown in FIG. 1.

A magnetic sensor device 11 according to a first embodiment of the present invention is shown in FIGS. 1 and 2. FIG. 1 is a front view of the magnetic sensor device 11, and FIG. 2 is a plan view thereof. Basically, the magnetic sensor device 11 is constructed with a rotating member 12 and a magnetic sensor 20.

The rotating member 12 has a cylindrical shape and is provided with a magnetic element 13, which is an object that is detected, on the outer surface 12a thereof. The magnetic element 13 extends around the rotating member 12 by one turn and is inclined substantially linearly with respect to the rotating direction of the rotating member 12. End portions 13a and 13b of the magnetic element 13 are disposed at approximately the same position in the radial direction of the rotating member 12. The rotating member 12 is formed of a metal, a plastic, etc., and the magnetic element 13 is preferably constructed of a ferromagnetic material, and is formed of, for example, a metal or a ferrite containing ferrum, nickel, etc. The rotating member 12 and the magnetic element 13 may be integrally formed.

The magnetic sensor 20 includes magnetoresistive elements 21 and 22 and a magnet M1 for applying a bias magnetic field to the magnetoresistive elements 21 and 22. The magnetoresistive elements 21 and 22 are arranged in a direction perpendicular to the rotating direction of the magnetic element 13 (in other words, they are arranged in an axial direction of the rotating member 12) with a gap therebetween and oppose the magnetic element 13. More specifically, the magnetoresistive elements 21 and 22 are disposed between regions A, which correspond to the positions of the end portions 13a and 13b of the magnetic element 13, in the direction perpendicular to the rotating direction of the magnetic element 13.

Figure 3:
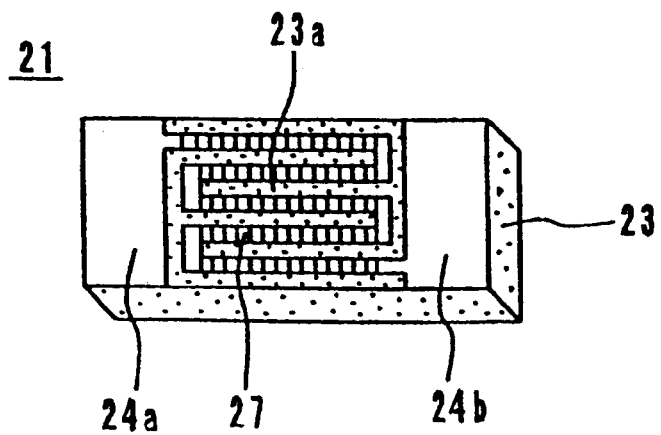
FIG. 3 is a perspective view of a magnetoresistive element used in the magnetic sensor device shown in FIG. 1.

Each of the magnetoresistive elements 21 and 22 is constructed with a substrate 23, a magnetoresistive pattern 27, and terminal electrodes 24a and 24b, as shown in FIG. 3 (only the magnetoresistive element 21 is shown in FIG. 3 as an example). The magnetoresistive pattern 27 and the terminal electrodes 24a and 24b are provided on the upper surface 23a (which will be referred to as a detection surface 23a in the following descriptions) of the substrate 23. The magnetoresistive elements 21 and 22 are constructed by the following process. First, a thin film of a compound semiconductor having a high carrier mobility such as InSb, InAs, GaAs, InSb—NiSb, etc., is formed on the substrate 23 by a bulk method, a vacuum deposition method, a sputtering method, an MBE method, a CVD method, etc. Then, a metal film of Al, Au, Ni, Cr, Ti, Cu, Pt, Pd, etc., is formed on the surface of the compound semiconductor thin film by a vapor deposition method, a sputtering method, a lift-off method, etc., with a predetermined pitch. By using a compound semiconductor having a high carrier mobility, output sensitivity of the magnetic sensor 20 can be increased.

Substrates formed of glass, sapphire, alumina, ferrite, single crystal silicon, GaAs, etc., and composite substrates such as SOI, SOS or the like, may be used as the substrate 23 of the magnetoresistive elements 21 and 22. The semiconductor thin film may be formed directly on the substrate 23. The semiconductor thin film which is separately prepared, or single crystal semiconductor substrate may be adhered on the substrate 23 by an adhesive. In a case in which the compound semiconductor is formed directly on the substrate 23 of sapphire or silicon by heteroepitaxial growth, a magnetic sensor device especially suitable for a torque sensor used in a vehicle in which the resistance to high temperature is required may be obtained.

The resistances of the magnetoresistive elements 21 and 22 increase with the magnetic field intensity. The magnetoresistive pattern 27 is formed in a meandered shape in order to obtain a predetermined resistance, and a ratio W/L of a width W and a length L of segments in the magnetoresistive pattern 27 is increased for increasing sensitivity. When the semiconductor magnetoresistive elements are used as the magnetoresistive elements 21 and 22 as described above, it is possible to set a gap G between the magnetic element 13 and the magnetoresistive elements 21 and 22 wider compared to other magnetoelectric transducers.

Figure 4:
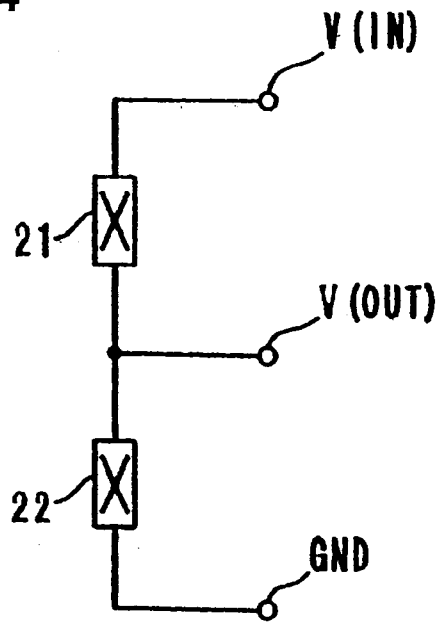
FIG. 4 is a circuit diagram of an electric circuit used in the magnetic sensor device shown in FIG. 1.

The magnetoresistive elements 21 and 22 are electrically connected as shown in FIG. 4. More specifically, the magnetoresistive elements 21 and 22 are first connected in series, and then are connected between an electric power terminal V(IN) and a ground terminal GND. Then, a constant voltage Vd is applied to the electric power terminal V(IN), and a voltage from an output terminal V(OUT), which is connected between the magnetoresistive elements 21 and 22, is obtained as an output signal S1.

Next, the operation of the magnetic sensor device 11, which is constructed as described above, will be described below.

As shown in FIG. 2, when the rotating member 12 is rotated by one turn in a direction shown by the arrow K1, the magnetic element 13 which is fixed to the rotating member 12 is also rotated by one turn. As described above, the magnetic element 13 is at an angle in an approximately linear manner. While the magnetic element 13 rotates, the outer surface 13c of the magnetic element 13 which opposes the magnetoresistive elements 21 and 22 moves relative to the magnetoresistive elements 21 and 22 in a direction shown by the arrow K2 (see FIG. 1). Accordingly, when, for example, the outer surface 13c opposes the magnetoresistive element 21 as shown in FIG. 1, the bias magnetic field generated by the magnet M1 is concentrated at the magnetoresistive element 21, so that the resistance of the magnetoresistive element 21 is increased. Conversely, intensity of the bias magnetic field generated by the magnet M1 is reduced at the magnetoresistive element 22 so that the resistance of the magnetoresistive element 22 is reduced, and the voltage obtained as the output signal S1 is also reduced.

Then, when the magnetic element 13 is rotated in the direction shown by the arrow K1, the outer surface 13c moves away from the magnetoresistive element 21 toward the magnetoresistive element 22. After the magnetic element 13 is rotated by 180 degrees from the position shown in FIGS. 1 and 2, the outer surface 13c opposes the magnetoresistive element 22. Thus, the bias magnetic field generated by the magnet M1 is concentrated at the magnetoresistive element 22, so that the resistance of the magnetoresistive element 22 is increased. Conversely, intensity of the bias magnetic field generated by the magnet M1 is reduced at the magnetoresistive element 21 so that the resistance of the magnetoresistive element 21 is reduced, and the voltage obtained as the output signal S1 increases.

Since a part of the magnetic element 13 which is at an angle in an approximately linear manner opposes the magnetoresistive elements 21 and 22, the resistances of the magnetoresistive elements 21 and 22 vary gradually and approximately linearly. Thus, the voltage obtained as the output signal S1 also varies gradually and approximately linearly.

When the magnetic element 13 is rotated by nearly 270 degrees from the position shown in FIG. 1 and 2, the end portions 13a and 13b of the magnetic element 13 (that is, a part of the magnetic element 13 which is discontinuous)

come closer to the magnetoresistive elements 21 and 22. Then, when the magnetic element 13 is rotated by 270 degrees, the outer surface 13c of the magnetic element 13 which opposes the magnetoresistive elements 21 and 22 jumps discontinuously from the end portion 13b to the end portion 13a. Thus, the resistance of the magnetoresistive element 21 is suddenly increased and the resistance of the magnetoresistive element 22 is suddenly reduced, and the output signal S1 is also suddenly reduced.

Then, when the magnetic element 13 is rotated still further, the outer surface 13c moves toward the magnetoresistive element 21, and opposes the magnetoresistive element 21 again when the magnetic element 13 is rotated by 360 degrees. Accordingly, the resistance of the magnetoresistive element 21 becomes the initial high value, and the resistance of the magnetoresistive element 22 becomes the initial low value.

Figure 5:
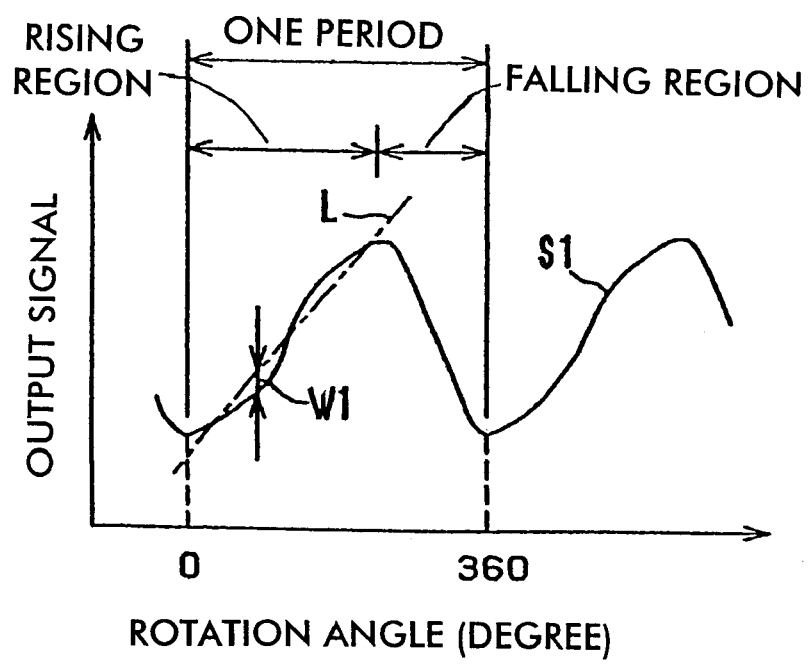
FIG. 5 is a graph showing a waveform of an output signal obtained from the magnetic sensor device shown in FIG. 1.

Accordingly, each time the rotating member 12 is rotated by one turn, a pseudo sawtooth wave shown in FIG. 5 is obtained for one period from the output terminal V(OUT) as the output signal S1. The output signal S1 has a waveform such that the rising region is broader than the falling region. The output signal S1 is increased approximately linearly in the rising region, in which the deviation W1 from a standard straight line L is approximately 3%. Accordingly, by measuring the voltage of the output signal S1 in the approximately linear rising region, the magnetic sensor device 11 of the non-contact type is able to determine a small variation in the rotation angle with high accuracy.

When the rotating member 12 is rotated in the direction opposite to the direction shown by the arrow K1, the rising region of the pseudo sawtooth wave becomes narrower than the falling region.

Figure 6:
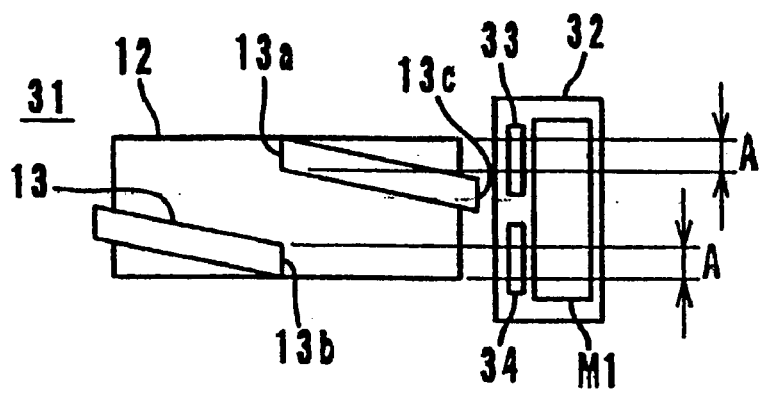
FIG. 6 is a front view of a magnetic sensor device according to another embodiment of the present invention.

As shown in FIG. 6, a magnetic sensor device 31 according to a second embodiment includes a magnetic sensor 32, in place of the magnetic sensor 20 included in the magnetic sensor device 11 according to the first embodiment. Magnetoresistive elements 33 and 34 of the magnetic sensor 32 are arranged in a direction parallel to the axial direction of the rotating member 12 with a gap therebetween and face the magnetic element 13. More specifically, parts of the magnetoresistive elements 33 and 34 overlap on the regions A, which correspond to the positions of the end portions 13a and 13b of the magnetic element 13, in the direction parallel to the axial direction of the rotating member 12.

In the magnetic sensor device 31 constructed as described above, the gap between the magnetoresistive elements 33 and 34 is larger then the gap between the magnetoresistive elements 21 and 22 in the first embodiment. Thus, when the outer surface 13c of the magnetic element 13 moves from one of the magnetoresistive elements 33 and 34 toward the other one, concentration of the bias magnetic field generated by the magnet M1 smoothly changes between the magnetoresistive elements 33 and 34.

Figure 7:
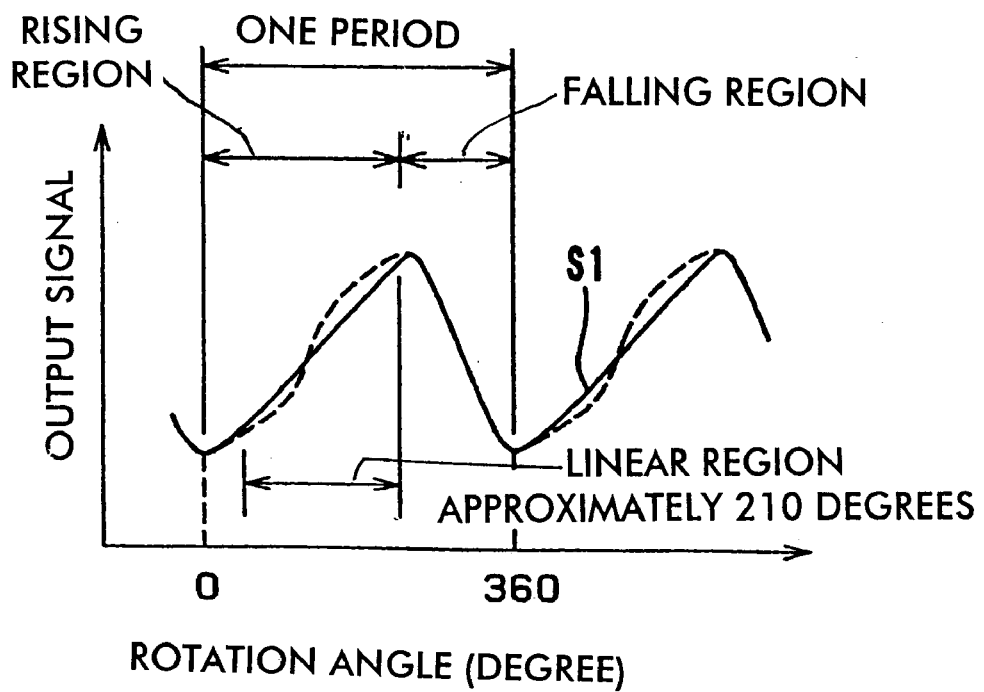
FIG. 7 is a graph showing a waveform of an output signal obtained from the magnetic sensor device shown in FIG. 6.

Accordingly, the resistances of the magnetoresistive elements 33 and 34 vary smoothly, and a pseudo sawtooth wave shown in FIG. 7 by a solid line is obtained as the output signal S1. The output-signal S1 is increased linearly in the rising region, and the deviation from the standard straight line is 1% or less, which is smaller than that in the output signal of the first embodiment (which is shown by a dotted line in FIG. 7). In addition, a region in which the deviation from the standard straight line is 1% or less has the range of approximately 210 degrees in terms of the rotation angle. Accordingly, by measuring the voltage of the output signal S1 in the linearly rising region, the variation in the rotation angle may be determined with higher accuracy.

Figure 8:
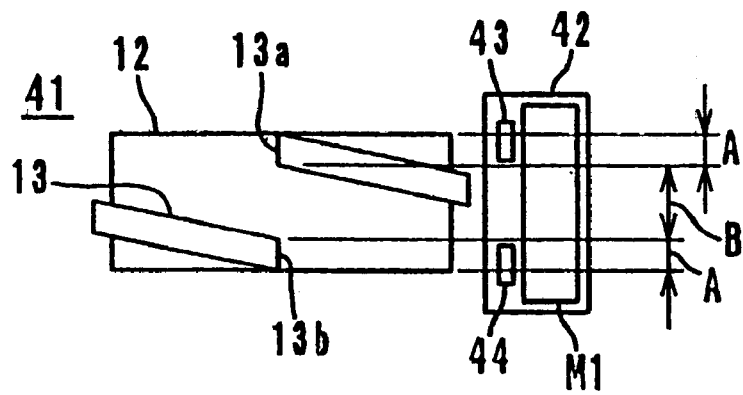
FIG. 8 is a front view of a magnetic sensor device according to another embodiment of the present invention.

As shown in FIG. 8, a magnetic sensor device 41 according to a third embodiment includes a magnetic sensor 42, in place of the magnetic sensor 32 included in the magnetic sensor device 31 according to the second embodiment. Magnetoresistive elements 43 and 44 of the magnetic sensor 42 are arranged in a direction parallel to the axial direction of the rotating member 12 with a gap therebetween and face the magnetic element 13. More specifically, parts of the magnetoresistive elements 43 and 44 overlap on the regions A, which correspond to the positions of the end portions 13a and 13b of the magnetic element 13, in the direction parallel to the axial direction of the rotating member 12. The gap between the magnetoresistive elements 43 and 44 is larger than the gap B between the end portions 13a and 13b of the magnetic element 13. In addition, the upper end portion of the magnetoresistive element 43 and the lower end portion of the magnetoresistive element 44 are disposed outside the magnetic element 13 and do not oppose the magnetic element 13.

Figure 9:
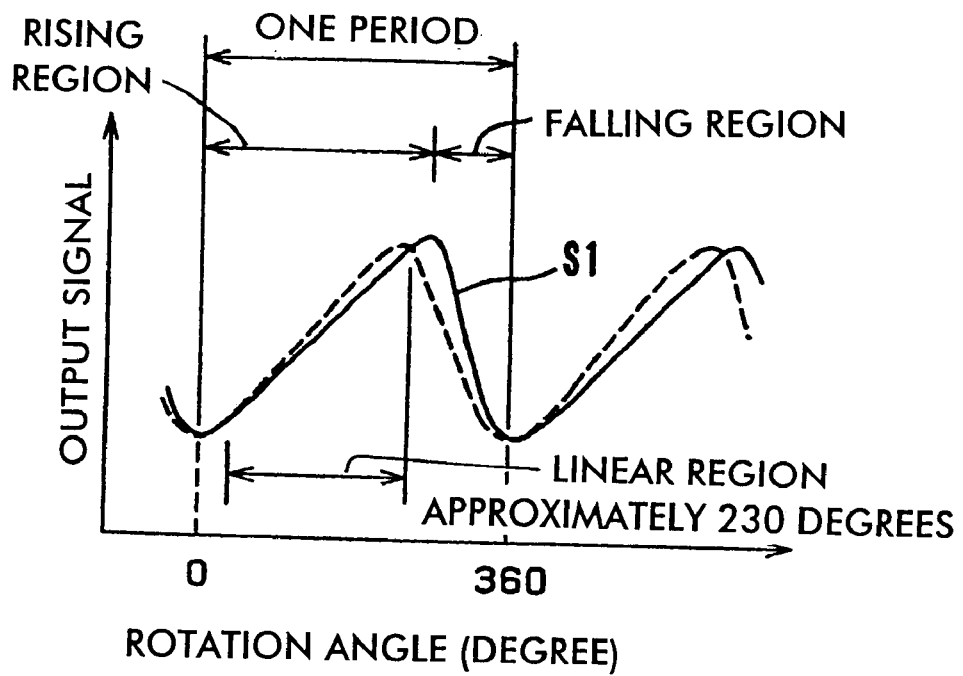
FIG. 9 is a graph showing a waveform of an output signal obtained from the magnetic sensor device shown in FIG. 9.

In the magnetic sensor device 41 which is constructed as described above, the gap between the magnetoresistive elements 43 and 44 is larger than the gap B between the end portions 13a and 13b of the magnetic element 13. Thus, compared to the second embodiment, the concentration of the bias magnetic field generated by the magnet M1 more smoothly changes between the magnetoresistive elements 43 and 44. Accordingly, the resistances of the magnetoresistive elements 43 and 44 vary more smoothly, and a pseudo sawtooth wave shown in FIG. 9 by a solid line is obtained as the output signal S1. The output signal S1 is increased linearly in the rising region, and the region in which the deviation from the standard straight line is 1% or less has the range of approximately 230 degrees in terms of the rotation angle, which is larger than that in the second embodiment (which is shown by a dotted line in FIG. 9). Accordingly, the variation in the rotation angle may be determined with higher accuracy, and the range of the rotation angle which can be detected increases.

Figure 10:
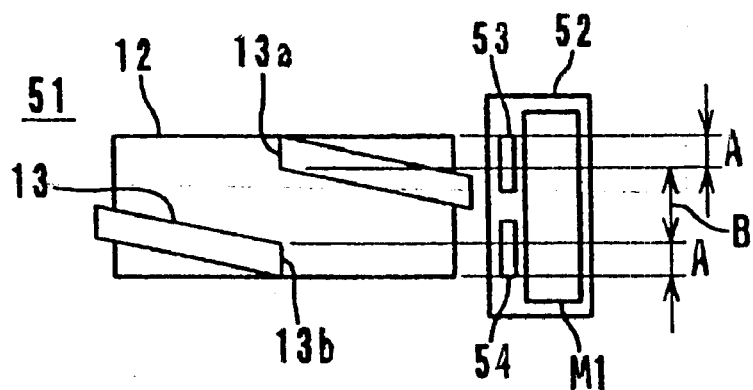
FIG. 10 is a front view of a magnetic sensor device according to another embodiment of the present invention.

As shown in FIG. 10, a magnetic sensor device 51 according to a fourth embodiment includes a magnetic sensor 52, in place of the magnetic sensor 32 included in the magnetic sensor device 31 according to the second embodiment. Magnetoresistive elements 53 and 54 of the magnetic sensor 52 are arranged in a direction parallel to the axial direction of the rotating member 12 with a gap therebetween and face the magnetic element 13. More specifically, parts of the magnetoresistive elements 53 and 54 overlap on the regions A, which correspond to the positions of the end portions 13a and 13b of the magnetic element 13, in the direction parallel to the axial direction of the rotating member 12. In addition, the remaining parts of the magnetoresistive elements 53 and 54, that is, the upper end portion of the magnetoresistive element 54 and the lower end portion of the magnetoresistive element 53, are disposed within the gap B between the end portions 13a and 13b of the magnetic element 13. Thus, all regions of the magnetoresistive elements 53 and 54 face the magnetic element 13.

Figure 11:
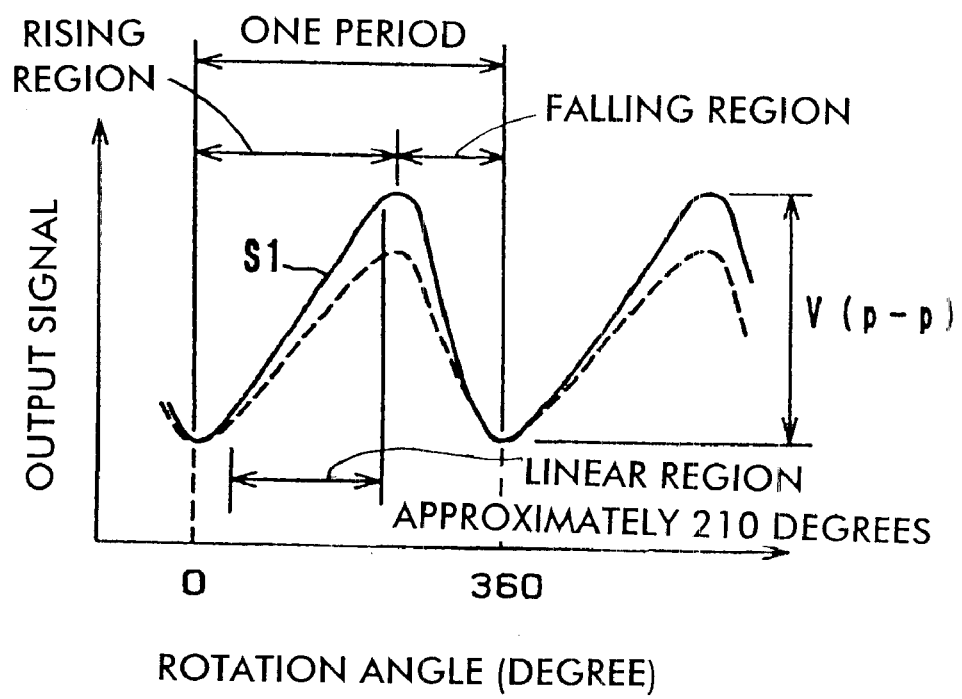
FIG. 11 is a graph showing a waveform of an output signal obtained from the magnetic sensor device shown in FIG. 10.

In the magnetic sensor device 51 which is constructed as described above, all regions of the magnetoresistive elements 53 and 54 face the magnetic element 13. Thus, compared to the second embodiment, variations in resistances of the magnetoresistive elements 53 and 54 are increased. Accordingly, as shown in FIG. 11 by a solid line, a pseudo sawtooth wave having a large peak-to-peak voltage V(p-p) (more specifically, about 1.2 to 1.5 times larger compared to V(p-p) of the output signal in the second embodiment) is obtained as the output signal S1. For the purpose of comparison, the output signal obtained in the second embodiment is also shown in FIG. 11 by a dotted line. The region in which the deviation from the standard straight line is 1% or less has the range of approximately 210 degrees in terms of a rotation angle. Accordingly, the magnetic sensor device 51 having a high sensitivity to a variation in a rotation angle in the linear region is obtained. In addition, since the variation in the output signal S1 which corresponds to the small variation in the rotation angle is increased, the output signal S1 becomes stable and signal processing can be easily performed.

Figure 12:
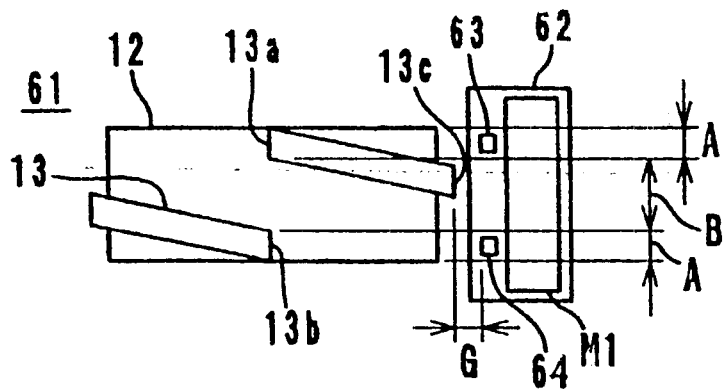
FIG. 12 is a front view of a magnetic sensor device according to another embodiment of the present invention.

As shown in FIG. 12, a magnetic sensor device 61 according to a fifth embodiment includes a magnetic sensor 62, in place of the magnetic sensor 32 included in the magnetic sensor device 31 according to the second embodiment. Magnetoresistive elements 63 and 64 of the magnetic sensor 62 are arranged in a direction parallel to the axial direction of the rotating member 12 with a gap therebetween and face the magnetic element 13. More specifically, the magnetoresistive elements 63 and 64 are disposed within the regions A, which correspond to the positions of the end portions 13a and 13b of the magnetic element 13, in the direction parallel to the axial direction of the rotating member 12.

In the magnetic sensor device 61 which is constructed as described above, when the end portion 13a of the magnetic element 13 moves closer to the magnetoresistive element 63, all regions of the magnetoresistive element 63 oppose the end portion 13a. In addition, when the end portion 13b of the magnetic element 13 moves closer to the magnetoresistive element 64, the entire region of the magnetoresistive element 64 opposes the end portion 13b. Thus, variations in resistances of the magnetoresistive elements 63 and 64 are increased, so that sensitivities thereof are increased. In addition, since the gap between the magnetoresistive elements 63 and 64 is larger than the gap B between the end portions 13a and 13b of the magnetic element 13, concentration of the bias magnetic field generated by the magnet M1 to the magnetoresistive elements more smoothly changes between the magnetoresistive elements 63 and 64.

Figure 13:
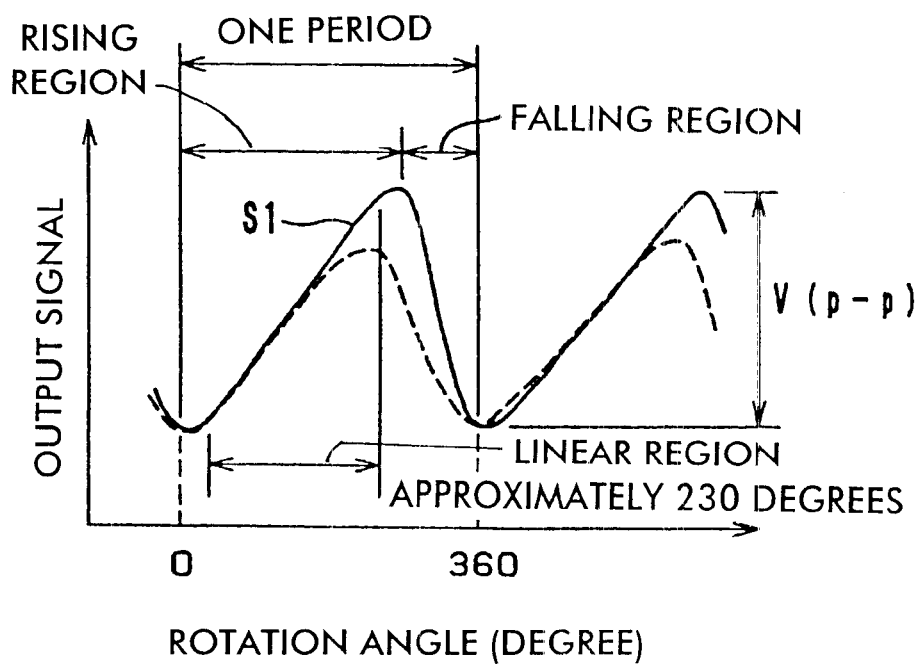
FIG. 13 is a graph showing a waveform of an output signal obtained from the magnetic sensor device shown in FIG. 12.

Accordingly, the resistances of the magnetoresistive elements 63 and 64 vary smoothly, and a pseudo sawtooth wave shown in FIG. 13 by a solid line is obtained as the output signal S1. Compared to the output signal obtained in the second embodiment, the range of the region in which the deviation from the standard straight line is 1% or less is increased by 20 degrees in terms of the rotation angle, and the peak-to-peak voltage V(p-p) is increased by about 1.2 to 1.5 times. Accordingly, the magnetic sensor device 61 having a large detection range and high sensitivity to a variation in a rotation angle is obtained.

Figure 14A:
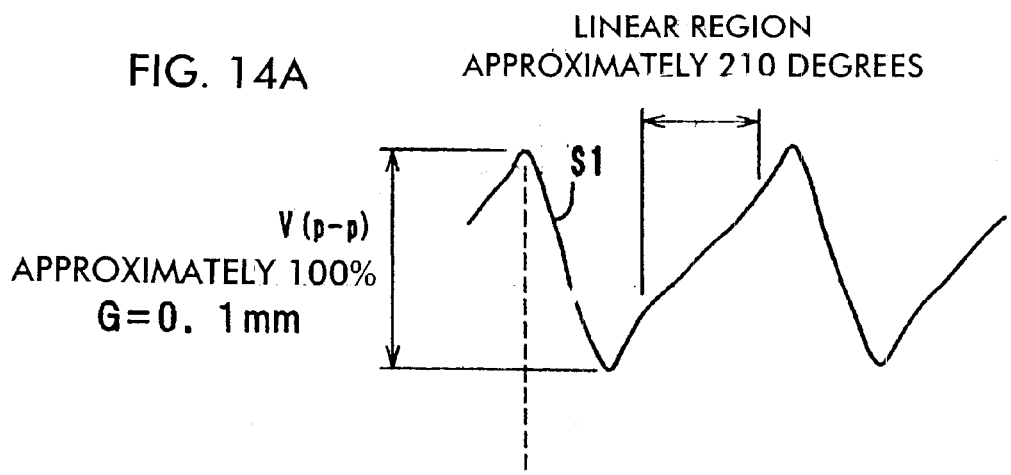
FIGS. 14A to 14C are graphs showing waveforms of output signals in which a gap between a magnetic element and magnetoresistive elements is varied.

Next, the gap G between the outer surface 13c of the magnetic element 13 and the magnetoresistive elements 63 and 64 is varied, and the waveforms obtained from the output signal S1 are evaluated. As a result, when the gap G is less than 0.3 mm, the voltage is steeply increased at peaks in the waveform, and the region in which the deviation from the standard straight line is 1% or less is reduced. FIG. 14A is a graph showing a waveform of the output signal S1 in the case in which the gap G is 0.1 mm. As is understood from the graph, the device becomes unsuitable for use as a magnetic sensor device, in which the linear region in the pseudo sawtooth wave is used.

Figure 14B:
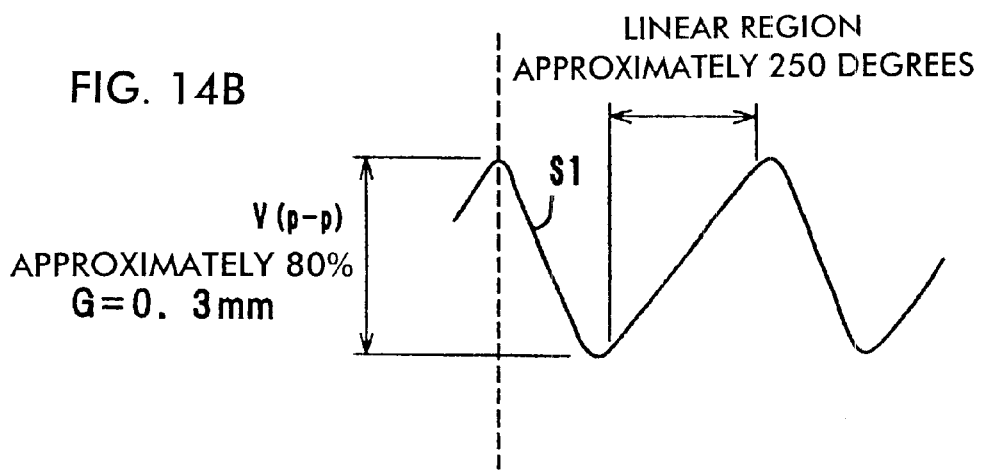
Figure 14C:
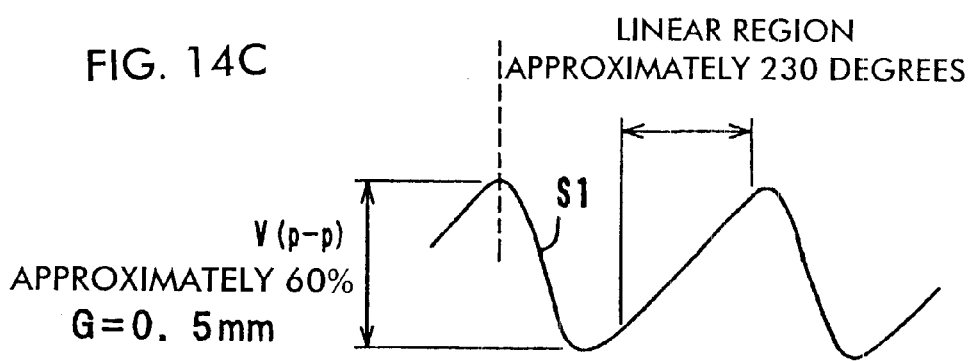

When the gap G is 0.3 mm or greater, linearity of the linear region is excellent. FIGS. 14B and 14C are graphs showing waveforms of the output signal S1 in the case in which the gap G is 0.3 mm and 0.5 mm, respectively. As is understood from the graphs, in order to increase the linear region and to improve linearity, it is efficient to set the gap G to 0.3 mm or greater. Thus, preferably, semiconductor magnetoresistive elements having a high sensitivity even when the gap G is increased are preferably used as the magnetoresistive elements.

Figure 15:
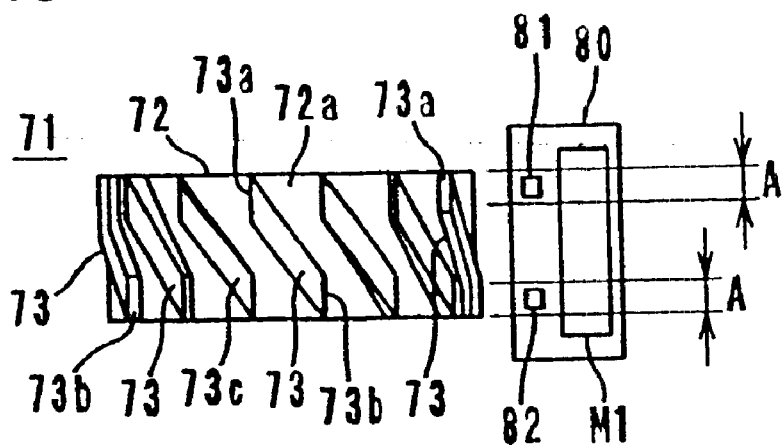
FIG. 15 is a front view of a magnetic sensor device according to another embodiment of the present invention.
Figure 16:
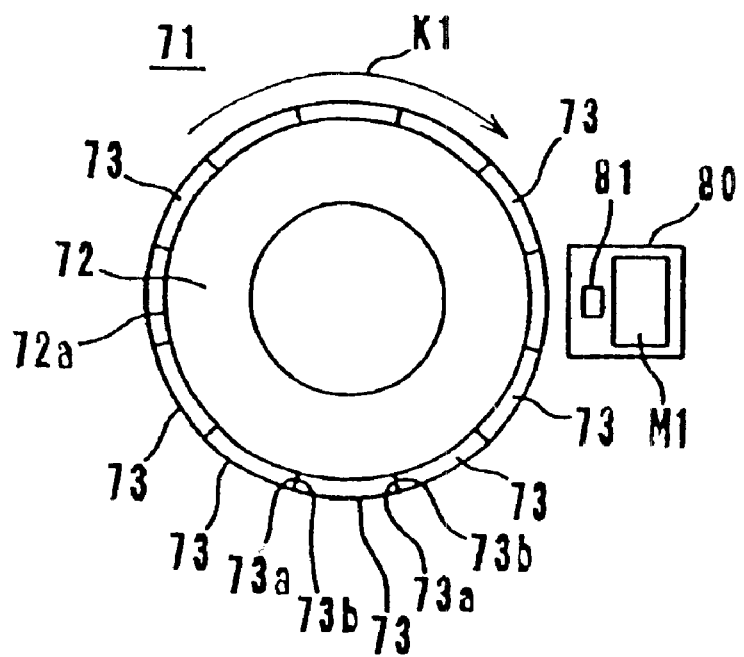
FIG. 16 is a plan view of the magnetic sensor device shown in FIG. 15.

FIG. 15 is a front view of a magnetic sensor device 71 according to a sixth embodiment, and FIG. 16 is a plan view of the magnetic sensor device 71. A rotating member 72 having a cylindrical shape is provided with a plurality of magnetic elements 73, which are objects that are detected, on the outer surface 72a thereof. The magnetic elements 73 are arranged such that the magnetic elements 73 are at an angle relative to the rotating direction of the rotating member 72 (the direction shown by the arrow K1 in FIG. 16) in an approximately linear manner. Adjacent magnetic elements 73 are disposed parallel to each other. In addition, the end 73a of each of the magnetic elements 73 and the end 73b of the adjacent magnetic element 73 are disposed at the same position in the radial direction of the rotating member 12.

A magnetic sensor 80 includes magnetoresistive elements 81 and 82 and the magnet M1. The magnetoresistive elements 81 and 82 are arranged in a direction parallel to the axial direction of the rotating member 72 with a gap therebetween and oppose the magnetic elements 73. More specifically, the magnetoresistive elements 81 and 82 are disposed at positions inside regions A, which correspond to the positions of the ends 73a and 73b of the magnetic elements 73, in the direction parallel to the axial direction of the magnetic elements 73. The positional relationship between the magnetic elements 73 and the magnetoresistive elements 81 and 82, however, are not limited to this. The magnetoresistive elements 81 and 82 may also be disposed at positions described in the first to fifth embodiment.

In the magnetic sensor device 71 which is constructed as described above, the rotating member 72 is provided with a plurality of magnetic elements 73 on the outer surface 72a thereof. Thus, each time the rotating member 72 is rotated by one turn, a plurality of periods of a pseudo sawtooth wave is output, wherein the number of periods is the same as the number of the magnetic elements 73. More specifically, in the magnetic sensor device 71 according to the sixth embodiment, each time the rotating member 72 is rotated by one turn, twelve periods of a pseudo sawtooth wave is obtained as the output signal S1. Accordingly, when a plurality of magnetic elements are provided on the outer surface of the rotating member, voltage variation of the output signal S1 which occurs when the rotation angle is varied for a certain degree is increased. Accordingly, the magnetic sensor device 71, which is able to stably detect variation in a rotation angle with high accuracy, is obtained.

Figure 17:
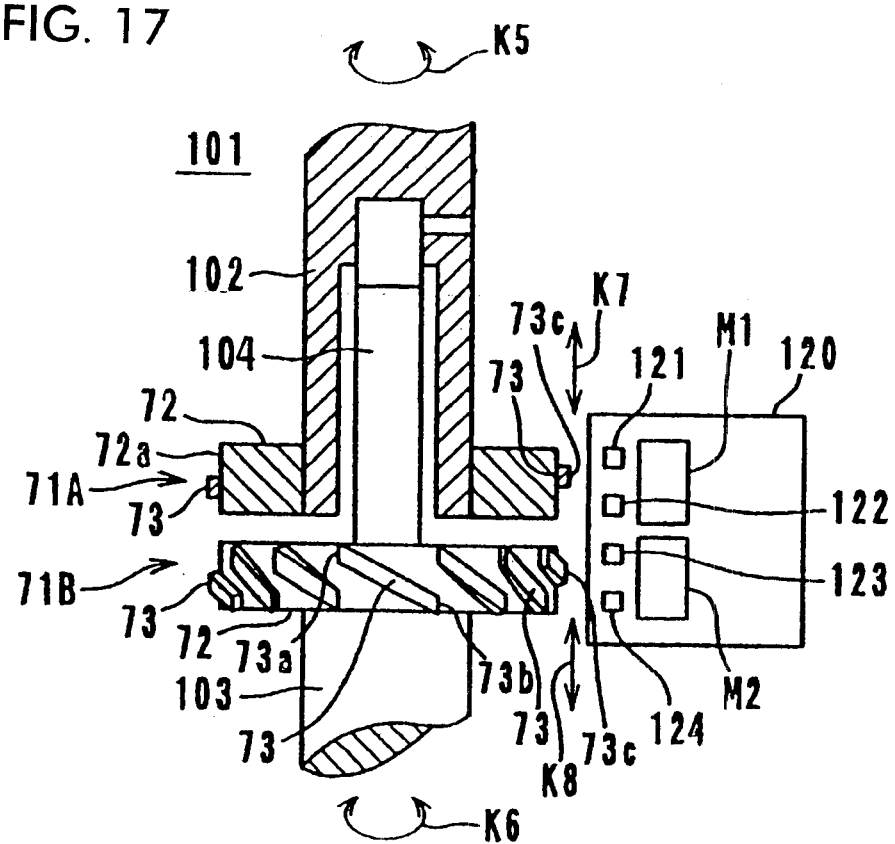
FIG. 17 is a partly sectioned view of a torque sensor according to another embodiment of the present invention.
Figure 18:
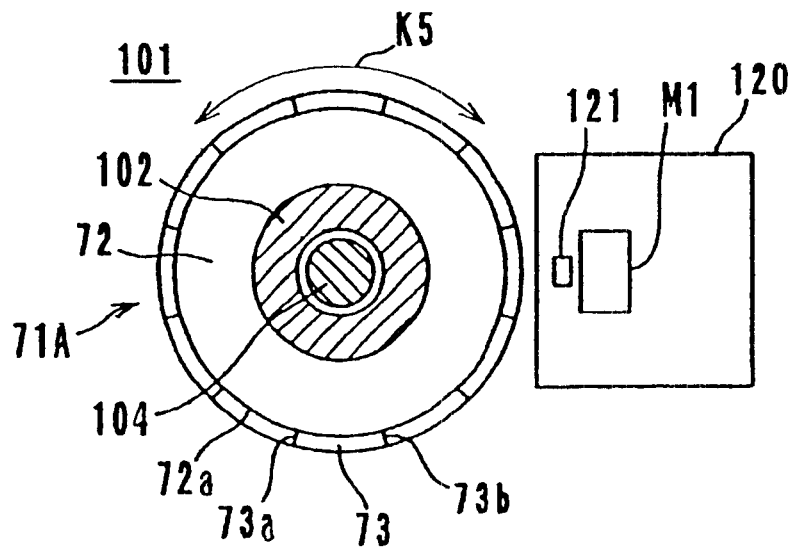
FIG. 18 is a cross sectional view of the torque sensor shown in FIG. 17.

A torque sensor according to a seventh embodiment of the present invention is shown in FIGS. 17 and 18. With reference to the figures, a torque sensor 101 includes a steering shaft 102 which is attached to a steering wheel (not shown) and a mechanical shaft 103 which is attached to a steering mechanism (not shown). The steering shaft 102 and the mechanical shaft 103 are coaxially connected to each other via a torsion bar 104 such that the steering shaft 102 and the mechanical shaft 103 can rotate relative to each other. When a torque is generated between the steering shaft 102 and the mechanical shaft 103, the torsion bar 104, which is easily deformed elastically, is twisted.

The steering shaft 102 and the mechanical shaft 103 are provided with magnetic sensor devices 71A and 71B, respectively, which have constructions similar to that of the magnetic sensor device 71 according to the sixth embodiment. The steering shaft 102 is inserted through the cylindrical rotating member 72 in the magnetic sensor device 71A and is fixed thereto. Similarly, the mechanical shaft 103 is inserted through the cylindrical rotating member 72 in the magnetic sensor device 71B and is fixed thereto. In order to synchronize the output signals S1 and S2 obtained from a magnetic sensor unit 120, the rotating members 72 are disposed such that the magnetic elements 73 provided on the steering shaft 102 and on the mechanical shaft 103 are aligned in the axial direction of the shafts 102 and 103.

The magnetic sensor unit 120, which is common to the magnetic sensor devices 71A and 71B, contains two magnetic sensors, and is provided with magnetoresistive elements 121 to 124 and magnets M1 and M2. The magnetoresistive elements 121 to 124 are arranged along the axial direction of the shafts 102 and 103 with gaps therebetween. In addition, the magnetoresistive elements 121 and 122 face the magnetic elements 73 of the magnetic sensor device 71A, and the magnetoresistive elements 123 and 124 face the magnetic elements 73 of the magnetic sensor device 71B. The two magnetic sensors may also be individually disposed for each of the magnetic sensor devices 71A and 71B.

Figure 19:
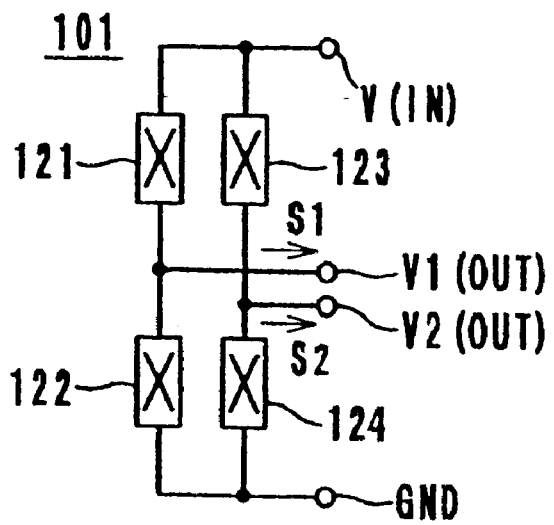
FIG. 19 is a circuit diagram of an electric circuit used in the torque sensor shown in FIG. 17.

The magnetoresistive elements 121 to 124 are electrically connected as shown in FIG. 19. More specifically, first, the magnetoresistive elements 121 and 122 are connected in series to each other, and the magnetoresistive elements 123 and 124 are connected in series to each other. Then, the two pairs of magnetoresistive elements 121 and 122 and the magnetoresistive elements 123 and 124 are connected in parallel between an electric power terminal V(IN) and a ground terminal GND. Then, a constant voltage Vd is applied to the electric power terminal V(IN). A voltage from an output terminal V1(OUT) connected between the magnetoresistive elements 121 and 122 is obtained as the output signal S1, and a voltage from an output terminal V2(OUT) connected between the magnetoresistive elements 123 and 124 is obtained as the output signal S2.

Next, the operation of the torque sensor 101 which is constructed as described above will be described below.

As shown in FIG. 17, when the steering shaft 102 is rotated by one turn in a direction shown by the arrow K5, the rotating member 72 fixed to the steering shaft 102 is also rotated by one turn along with the steering shaft 102. While the rotating member 72 is rotated, the outer surface 73c of the magnetic element 73 provided on the outer surface 72a of the rotating member 72 moves relative to the magnetoresistive elements 121 and 122 in a direction shown by the arrow K7.

When the steering shaft 102 is rotated, the mechanical shaft 103 is also rotated via the torsion bar 104 in a direction shown by the arrow K6. In addition, the rotating member 72 fixed to the mechanical shaft 103 is also rotated along with the mechanical shaft 103. While the rotating member 72 is rotated, the outer surface 73c of the magnetic element 73 provided on the outer surface of the rotating member 72 moves relative to the magnetoresistive elements 123 and 124 in a direction shown by the arrow K8. When a torque is not applied between the steering shaft 102 and the mechanical shaft 103, relative positions between the magnetic elements 73 provided on the steering shaft 102 and the magnetic elements 73 provided on the mechanical shaft 103 do not change.

Accordingly, when, for example, the outer surface 73c of the magnetic element 73 provided on the steering shaft 102 opposes the magnetoresistive element 121, the bias magnetic field generated by the magnet M1 is concentrated at the magnetoresistive element 121, so that the resistance of the magnetoresistive element 121 is increased. Conversely, intensity of the bias magnetic field generated by the magnet M1 is reduced at the magnetoresistive element 122, so that the resistance of the magnetoresistive element 122 is reduced, and the voltage obtained as the output signal S1 is also reduced. At this time, the outer surface 73c of the magnetic element 73 provided on the mechanical shaft 103 opposes the magnetoresistive element 123. Thus, the bias magnetic field generated by the magnet M2 is concentrated at the magnetoresistive element 123, so that the resistance of the magnetoresistive element 123 is increased. Conversely, intensity of the bias magnetic field generated by the magnet M2 is reduced at the magnetoresistive element 124, so that the resistance of the magnetoresistive element 124 is reduced, and the voltage obtained as the output signal S2 is also reduced.

When the shafts 102 and 103 are rotated, the outer surface 73c of the magnetic elements 73 provided on the steering shaft 102 moves away from the magnetoresistive element 121 toward the magnetoresistive element 122. In addition, the outer surface 73c of the magnetic elements 73 provided on the mechanical shaft 103 moves away from the magnetoresistive element 123 toward the magnetoresistive element 124. When the outer surface 73c of the magnetic elements 73 in the steering shaft 102 opposes the magnetoresistive element 122, the resistance of the magnetoresistive element 122 is increased and the resistance of the magnetoresistive element 121 is reduced. In addition, the outer surface 73a of the magnetic elements 73 in the mechanical shaft 103 opposes the magnetoresistive element 124, so that the resistance of the magnetoresistive element 124 is increased and the resistance of the magnetoresistive element 123 is reduced. Accordingly, the voltages obtained as the output signals S1 and S2 are increased.

Then, when the shafts 102 and 103 are rotated still further, the ends 73a and 73b (that is, parts of the magnetic elements 73 which are discontinuous) move toward the magnetoresistive elements 121 to 124 and oppose the magnetoresistive elements 121 to 124. Thus, the outer surface 73a which opposes the magnetoresistive elements 121 and 122 jumps discontinuously from the end portion 13b to the end portion 13a, and the outer surface 73a which oppose the magnetoresistive elements 123 and 124 also jumps discontinuously from the end portion 13b to the end portion 13a. Accordingly, the resistances of the magnetoresistive elements 121 and 123 are suddenly increased and the resistances of the magnetoresistive elements 122 and 124 are suddenly reduced, so that the output signals S1 and S2 are also suddenly reduced.

Then, when the shafts 102 and 103 are rotated still further, the outer surfaces 73a of the magnetic elements 73 oppose the magnetoresistive elements 121 and 123 again. Accordingly, the resistances of the magnetoresistive elements 121 and 123 become the initial high values, and the resistances of the magnetoresistive elements 122 and 124 become the initial low values.

Figure 20:
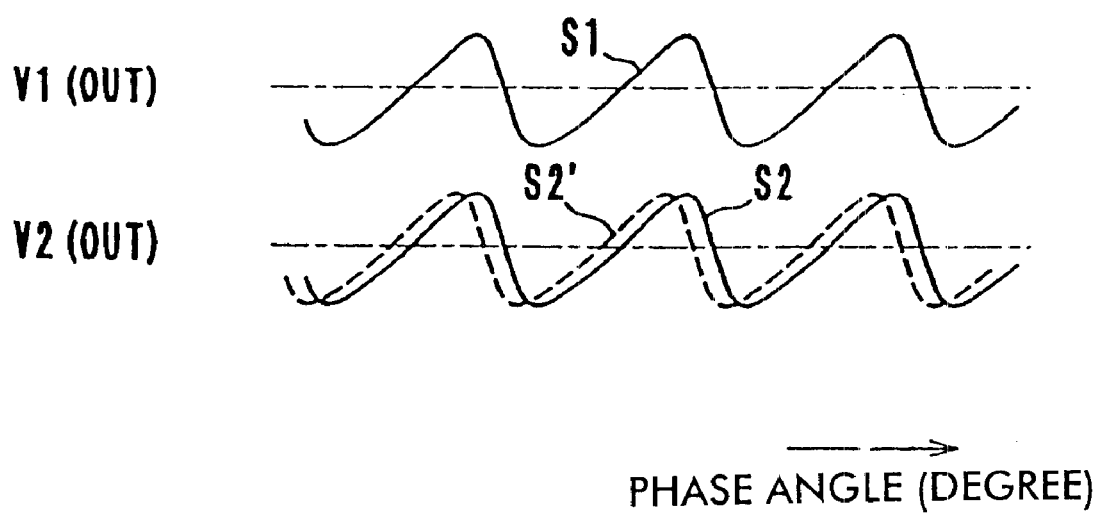
FIG. 20 is a graph showing waveforms of output signals obtained from the torque sensor shown in FIG. 17.

Accordingly, each time the rotating members 72 are rotated by one turn, twelve periods of pseudo sawtooth waves shown in FIG. 20 are obtained from the output terminals V1(OUT) and V2(OUT) as the output signals S1 and S2. Since the magnetic elements 73 are aligned in the axial direction of the shafts 102 and 103, the phase difference between the output signals S1 and S2 is zero degree. The output signals S1 and S2 are used as control circuit signals for electric power steering apparatuses.

When a torque is applied between the steering shaft 102 and the mechanical shaft 103 and the torsion bar 104 is twisted, the relative position between the magnetic elements 73 provided on the steering shaft 102 and the magnetic elements 73 provided on the mechanical shaft 103 varies. Accordingly, an output signal S2' shown in FIG. 20 by a dotted line is obtained as the output signal S2, and a voltage difference occurs between the output signals S1 and S2. An amount of torsional deformation of the torsion bar 104 is approximately proportional to the voltage difference between the output signals S1 and S2. The torque sensor 101 determines the difference in the relative rotation angle between the shafts 102 and 103 from change in the voltage difference, and then calculates the torque amount from the Young's modulus of the torsion bar 104. Thus, the magnetoresistive elements 121 to 124, which are mechanically independent from the shafts 102 and 103, are arranged, and the torque applied between the shafts 102 and 103 is calculated without contacting them. Accordingly, the torque sensor 101 having a high durability is obtained.

In addition, since a plurality of periods of pseudo sawtooth waves are obtained while the rotating members 72 are rotated by one turn, the torque sensor 101 can also be used as a steering angle sensor by counting the periods of the pseudo sawtooth waves. Accordingly, a sensor which is exclusively used as a steering angle sensor can be omitted, and the cost for producing the electric power steering apparatus can be reduced.

Figure 21:
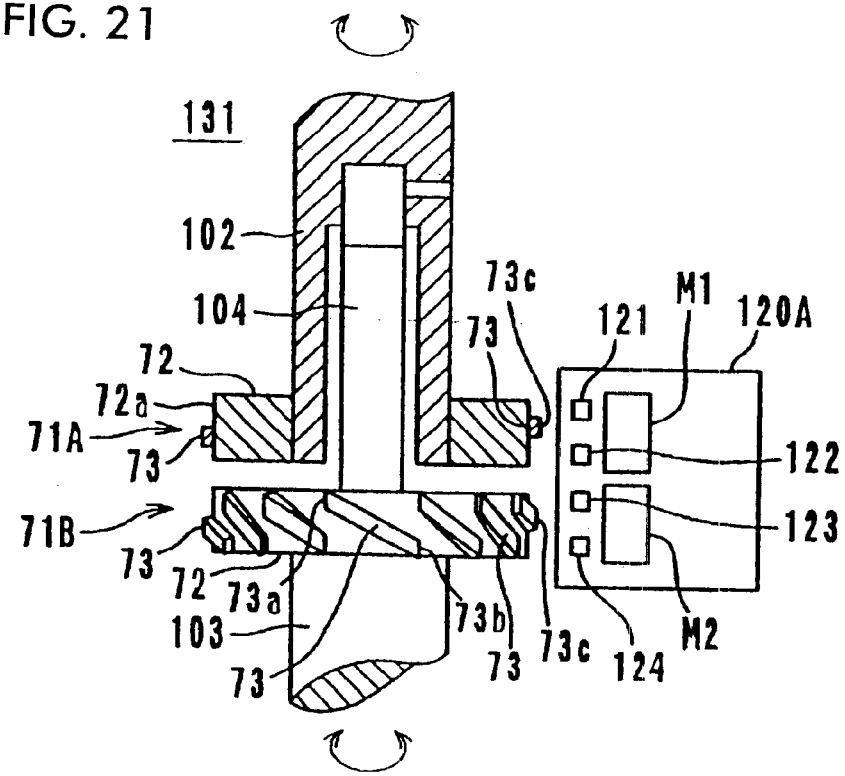
FIG. 21 is a partly sectioned view of a torque sensor according to another embodiment of the present invention.
Figure 22:
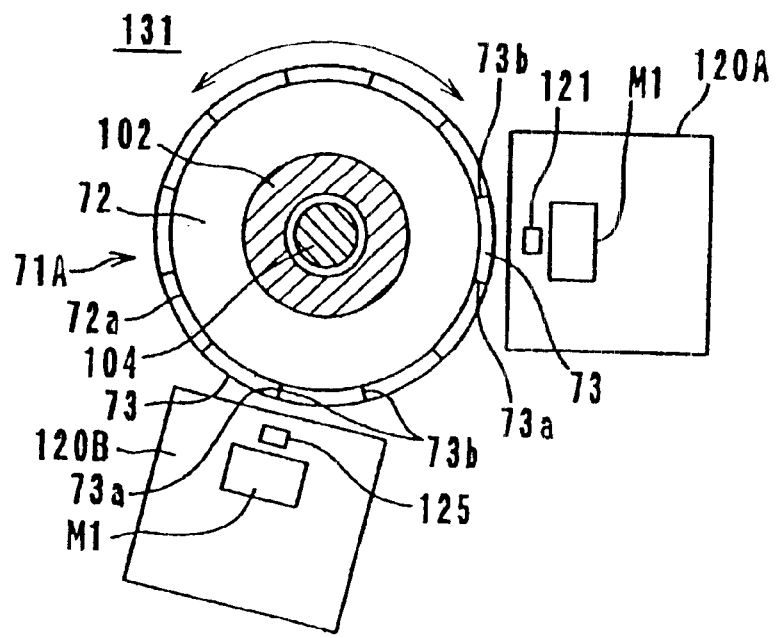
FIG. 22 is a cross sectional view of the torque sensor shown in FIG. 21.

As shown in FIGS. 21 and 22, a torque sensor 131 according to the eighth embodiment is constructed similarly to the torque sensor 101 according to the seventh embodiment except that the torque sensor 131 includes two magnetic sensors.

Figure 23:
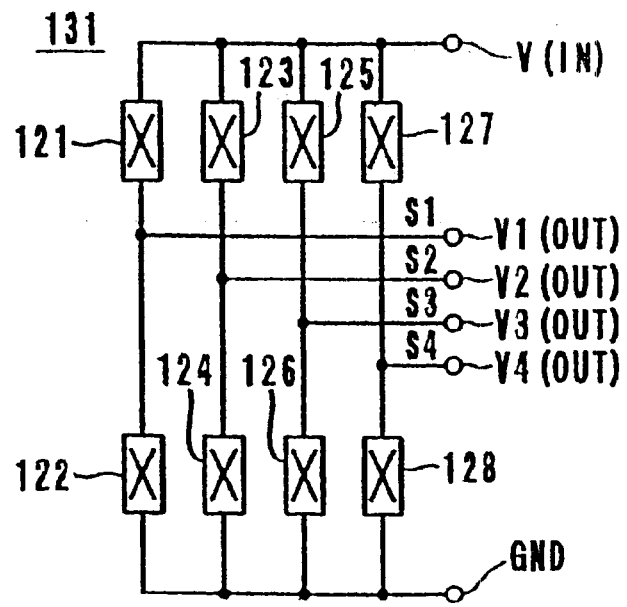
FIG. 23 is a circuit diagram of an electric circuit used in the torque sensor shown in FIG. 21.

A magnetic sensor unit 120A contains two magnetic sensors, and is provided with magnetoresistive elements 121 to 124 and magnets M1 and M2. Similarly, a magnetic sensor unit 120B contains two magnetic sensors, and is provided with magnetoresistive elements 125 to 128 (see FIG. 23) and magnets M1 and M2. The magnetoresistive elements 121 to 124 and 125 to 128 are arranged along the axial direction of the shafts 102 and 103 with gaps therebetween. In addition, the magnetoresistive elements 121, 122, 125, and 126 oppose the magnetic elements 73 of the magnetic sensor device 71A, and the magnetoresistive elements 123, 124, 127 and 128 oppose the magnetic elements 73 of the magnetic sensor device 71B. The magnetoresistive elements 121 to 128 are electrically connected as shown in FIG. 23.

In addition, the magnetic sensor units 120A and 120B are disposed such that, when the magnetoresistive elements 121 to 124 oppose the magnetic elements 73 at the midsections thereof, the magnetoresistive elements 125 to 128 oppose parts of the magnetic elements 73 which are discontinuous, that is, the ends 73a and 73b of the magnetic elements 73.

Figure 24:
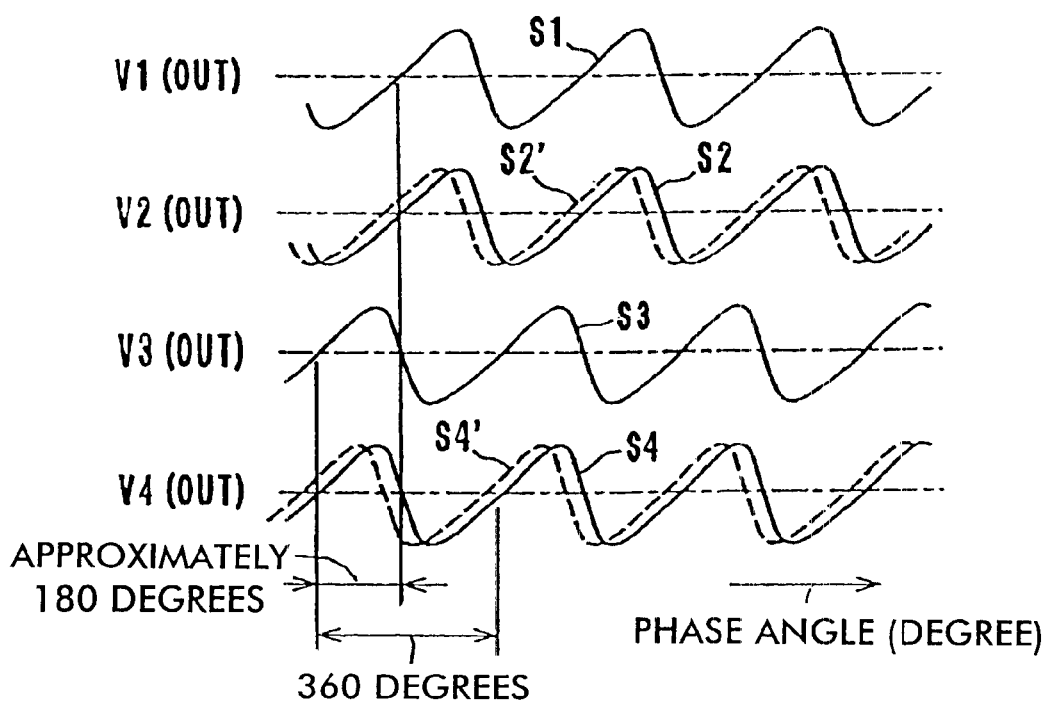
FIG. 24 is a graph showing waveforms of output signals obtained from the torque sensor shown in FIG. 21.

Next, the operation of the torque sensor 131 which is constructed as described above will be described below. When a torque is not applied between the steering shaft 102 and the mechanical shaft 103, every time the rotating members 72 are rotated by one turn, twelve periods of pseudo sawtooth waves shown in FIG. 24 are obtained from output terminals V1(OUT) to V4(OUT) as output signals S1 to S4. In such a case, the phase of the output signals S1 and S2 differ from the phase of the output signals S3 and S4 by 180 degrees.

When a torque is applied between the steering shaft 102 and the mechanical shaft 103 and the torsion bar 104 is twisted, the relative position between the magnetic elements 73 provided on the steering shaft 102 and the magnetic elements 73 provided on the mechanical shaft 103 varies. Accordingly, output signals S2' and S4' shown in FIG. 23 by a dotted lines are obtained as the output signals S2 and S4, and voltage differences occurs between the output signals S1 and S2 and between the output signals S3 and S4. The torque sensor 131 determines the difference in the rotation angle between the shafts 102 and 103 from the voltage differences, and then calculates the torque from the Young's modulus of the torsion bar 104.

When the output signals S1 and S2 are outside the linear regions of the pseudo sawtooth waves, it is difficult to accurately determine the torque from the voltage difference of the output signals S1 and S2. At this time, the output signals S3 and S4 are in the linear regions of the pseudo sawtooth waves in which a high sensitivity can be obtained. Therefore, in such a case, the output signals S3 and S4 are used for determining the torque. Accordingly, the torque sensor 131 is able to determine the torque more accurately.

Although the positional relationship between the magnetic sensor units 120A and 120B are such that the phase difference between the output signals S1 and S2 and the output signals S3 and S4 is 180 degree, the present invention is not limited to this. The positional relationship between the magnetic sensor units 120A and 120B can be freely decided as long as the phase of the output signals S1 and S2 and the phase of the output signals S3 and S4 differ from each other.

Figure 25A:
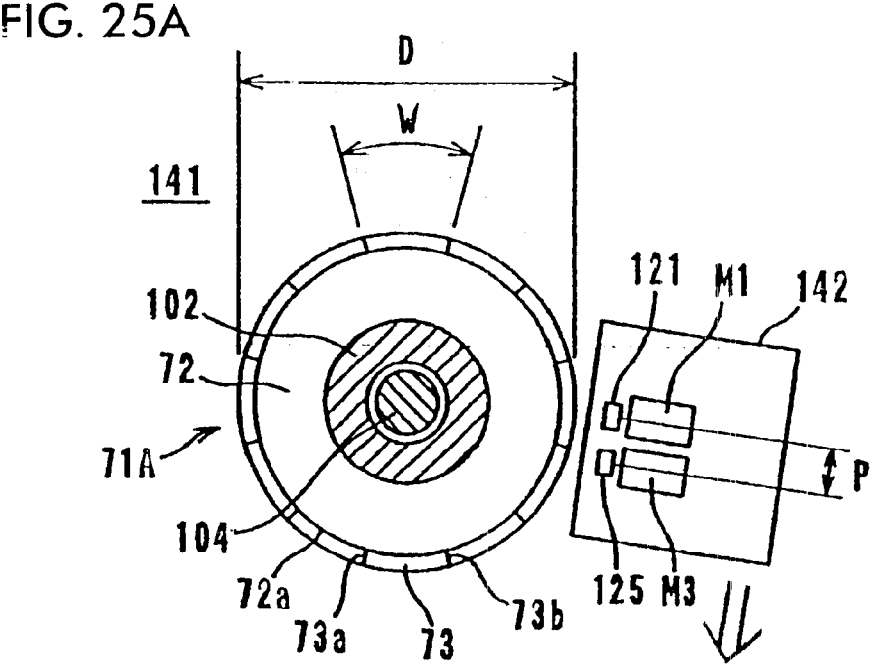
FIG. 25 is a partly sectioned view of a torque sensor according to another embodiment of the present invention.
Figure 25B:
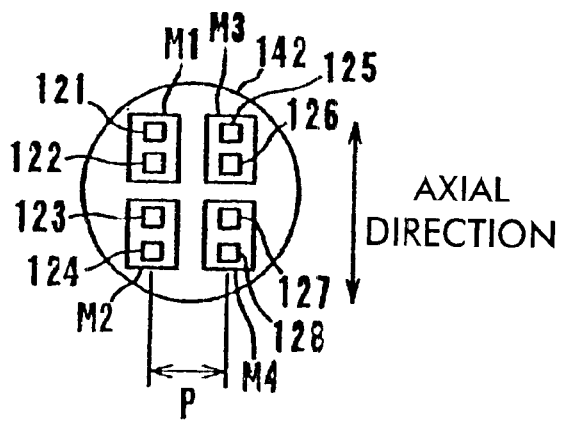

As shown in FIG. 25, the torque sensor 141 according to a ninth embodiment includes, instead of the magnetic sensor units 120A and 120B included in the torque sensor 131 according to the eighth embodiment, a magnetic sensor unit 142.

The magnetic sensor unit 142 contains four magnetic sensors, and is provided with magnetoresistive elements 121 to 128 and magnets M1 to M4. The magnetoresistive elements 121 to 124 and 125 to 128 are arranged along the axial direction of the shafts 102 and 103 with gaps therebetween. In addition, the magnetoresistive elements 121, 122, 125, and 126 oppose the magnetic elements 73 of the magnetic sensor device 71A, and the magnetoresistive elements 123, 124, 127 and 128 oppose the magnetic elements 73 of the magnetic sensor device 71B. The magnetoresistive elements 121 to 128 are electrically connected as shown in FIG. 23.

In the ninth embodiment, the magnetoresistive elements 121 to 128 are disposed such that the phase difference between the output signals S1 and S3 and the phase difference between the output signals S2 and S4 are 180 degrees as shown in FIG. 24. More specifically, the magnetoresistive elements 121 to 128 are disposed such that the gap P between the magnetoresistive elements 121 to 124 and the magnetoresistive elements 125 to 128 satisfies the following equation.

$$P \approx (D\pi/2) \times (W/360) + (D\pi) \times (W/360) \times n \qquad (1)$$

wherein,

D: diameter (mm) of the rotating members 72 on which the magnetic elements 73 are provided W: pitch (degree) between the magnetic elements 73, n: 0, 1, 2, 3, . . .

The effects obtained by the torque sensor 131 according to the eighth embodiment can also be obtained by the torque sensor 141 which is constructed as described above.

Figure 26:
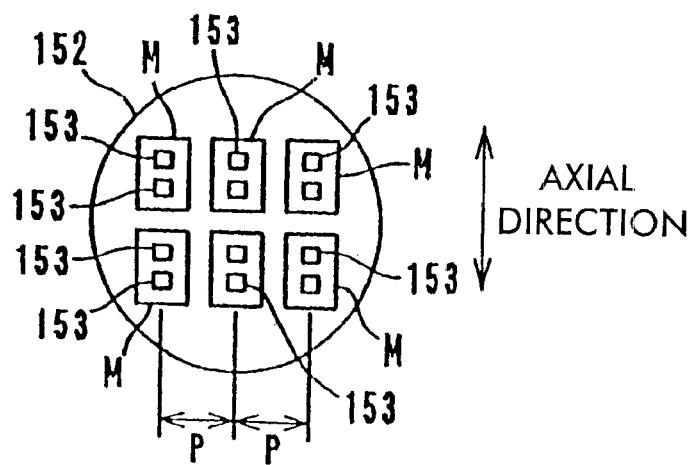
FIG. 26 is a front view of a magnetic sensor which is used in a torque sensor according to another embodiment of the present invention.

The phase difference of the output signals is not limited to 180 degrees, and can be freely determined. For example, output signals in which the phases differ by 120 degrees can be obtained by using a magnetic sensor unit 152 shown in FIG. 26, which contains six magnetic sensors and which is provided with twelve magnetoresistive elements 153 and six magnets M. In such a case, the magnetoresistive elements 153 are disposed such that the gap P therebetween satisfies the following equation.

$$P \approx (D\pi/3) \times (W/360) + (D\pi) \times (W/360) \times n \qquad (2)$$

The magnetic sensor, the magnetic sensor device, and the torque sensor of the present invention are not limited to the above-described embodiments, and various modifications are possible within the scope of the present invention. For example, in the magnetic sensor according to the above-described embodiments, the magnetoresistive elements are used as the magnetosensitive elements. However, Hall elements, ferromagnetic thin-film elements, MR elements may also be used as the magnetosensitive elements.

Figure 27:
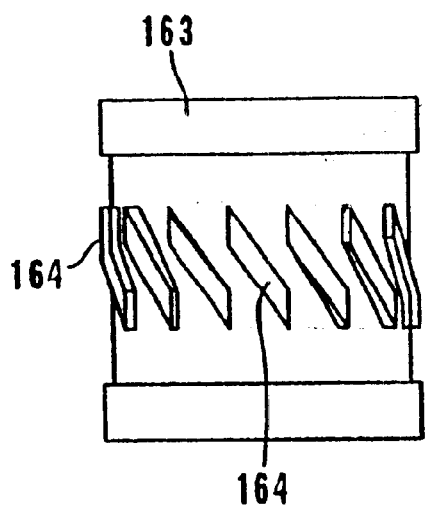
FIG. 27 is a front view of a modification of a rotating member which is provided with magnetic elements.
Figure 28:
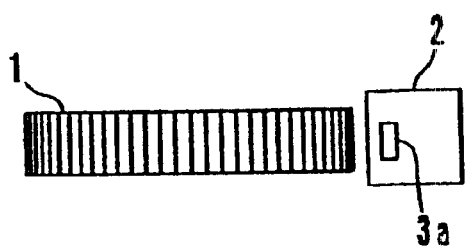
FIG. 28 is a front view of a conventional magnetic sensor device.
Figure 29:
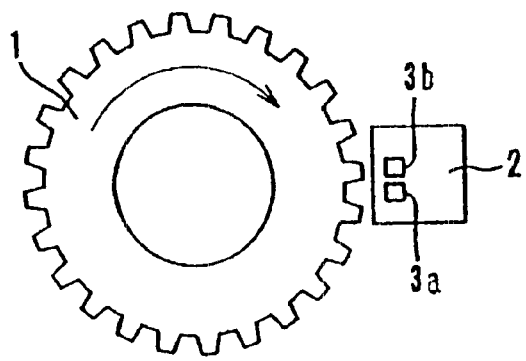
FIG. 29 is a front view of the magnetic sensor device shown in FIG. 28.
Figure 30:
FIG. 30 is a graph showing a waveform of an output signal obtained from the magnetic sensor device shown in FIG. 28.

In addition, in the above-described embodiments, the magnetic elements, which are objects that are detected, are formed as convexities on the cylindrical rotating member. However, as shown in FIG. 27, the magnetic elements may also be constructed by removing a part of a rotating member 163 formed of a magnetic material and leaving regions which correspond to detected portions 164. In addition, the magnetic elements, which are objects that are detected, are not necessarily provided on the outer surface of the cylindrical rotating member, and may also be provided, for example, on a base surface of a circular rotating plate.

What is claimed is:

1. A magnetic sensor for detecting a rotational displacement of a magnetic element which is disposed such that said magnetic element is inclined substantially linearly with respect to the rotating direction thereof, said magnetic sensor comprising:
   a plurality of magnetosensitive elements which are arranged in a direction perpendicular to the rotating direction of said magnetic element with a gap therebetween and face said magnetic element, at least parts of the respective magnetosensitive elements overlapping on end portions of said magnetic element in a direction perpendicular to the rotating direction of said magnetic element, the resistance of said magnetosensitive elements varying with the amount of displacement of said magnetic element.

2. A magnetic sensor according to claim 1, wherein the gap between said plurality of magnetosensitive elements is larger than a gap between the end portions of said magnetic element.

3. A magnetic sensor according to claim 1, wherein all regions of said plurality of magnetosensitive elements face said magnetic element in a direction perpendicular to the rotating direction of said magnetic element.

4. A magnetic sensor according to claim 1, wherein approximately all of the regions of said plurality of magnetosensitive elements face the end portions of said magnetic element in the direction perpendicular to the rotating direction of said magnetic element.

5. A magnetic sensor according to claim 1, wherein a distance between said magnetic element and said plurality of magnetosensitive elements is 0.3 mm or greater.

6. A magnetic sensor according to claim 1, wherein a plurality of said magnetic elements are arranged in the rotating direction thereof.

7. A magnetic sensor according to claim 1, wherein said plurality of magnetosensitive elements are semiconductor magnetoresistive elements.

8. A magnetic sensor device comprising:
   a magnetic element which is provided on a surface of the rotating member such that said magnetic element is inclined substantially linearly with respect to the rotating direction of said rotating member; and
   a magnetic sensor for detecting displacement of said magnetic element caused by the rotation of said rotating member, the magnetic sensor including a plurality of magnetosensitive elements which are arranged in a direction perpendicular to the rotating direction of said magnetic element with a gap therebetween and face said magnetic element, at least parts of said plurality of magnetosensitive elements overlapping on end portions of said magnetic element in a direction perpendicular to the rotating direction of said magnetic element, the resistance of said magnetosensitive elements varying with the amount of displacement of said magnetic element.

9. A torque sensor for detecting a torque applied between a plurality of shafts which are connected to each other via a torsion bar and are able to rotate relative to each other due to the torsional deformation of the torsion bar when the torque is applied, said torque sensor comprising:
   two or more magnetic sensors according to claim 1 provided for each of said plurality of shafts,
   wherein phases of the respective output signals obtained from said magnetic sensors differ from each other.

10. A torque sensor for detecting a torque applied between a plurality of shafts which are connected to each other via a torsion bar and are able to rotate relative to each other due to the torsional deformation of the torsion bar when the torque is applied, said torque sensor comprising:
    a magnetic sensor device according to claim 8 provided for each of said plurality of shafts,
    wherein phases of the respective output signals obtained from two or more magnetic sensors provided for each of said plurality of shafts differ from each other.

11. A torque sensor according to claim 9, wherein said torque sensor comprises two magnetic sensors provided for each of said plurality of shafts, and phases of the respective output signals obtained from said two magnetic sensors differ from each other by approximately 180 degrees.

12. A torque sensor according to claim 9, wherein said torque sensor comprises three magnetic sensors provided for each of said plurality of shafts, and phases of the respective output signals obtained from said three magnetic sensors differ from each other by approximately 120 degrees.

* * * * *